UNITED STATES PATENT OFFICE.

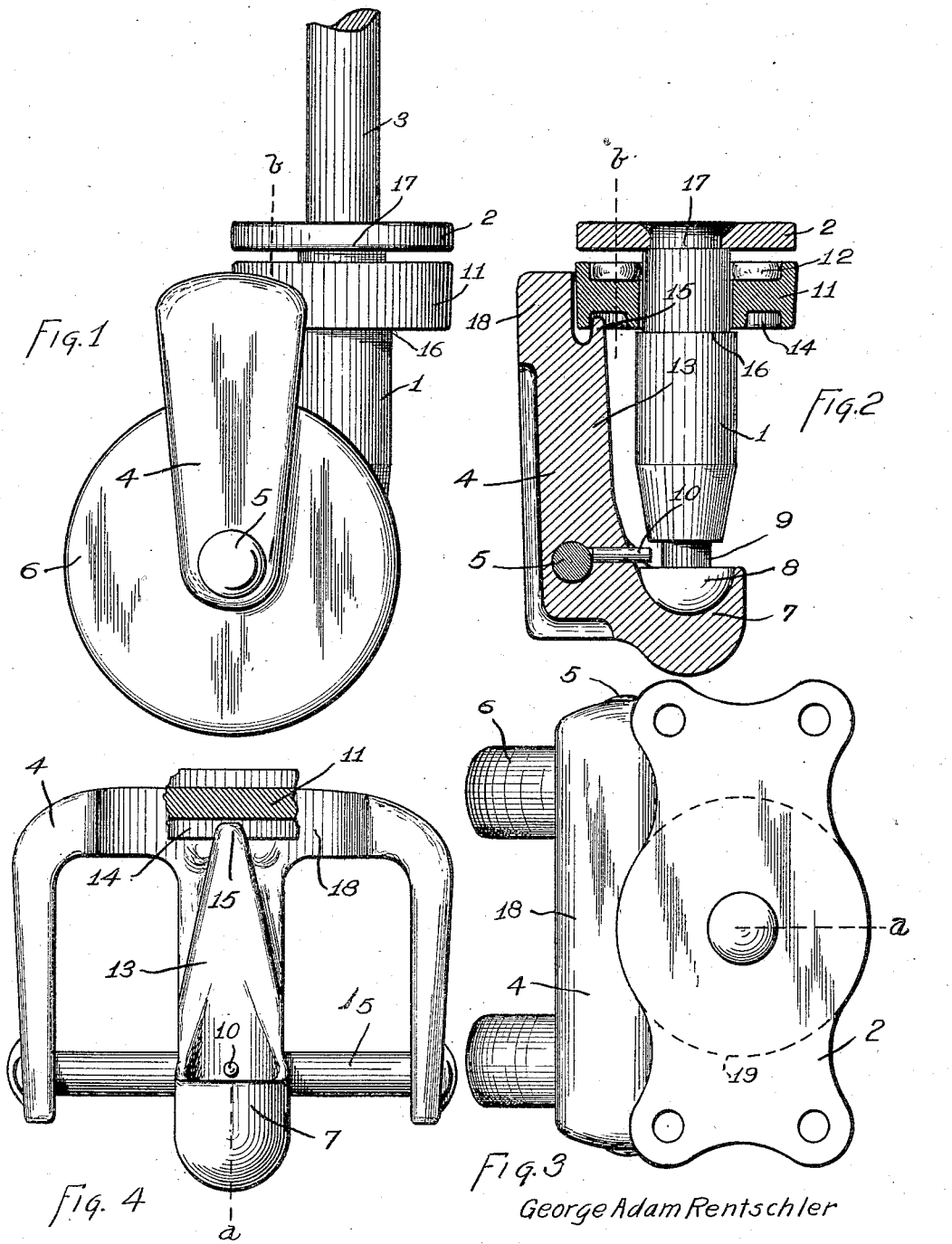

GEORG ADAM RENTSCHLER, OF HAMILTON, OHIO.

CASTER.

1,182,039.  Specification of Letters Patent.  Patented May 9, 1916.

Application filed August 10, 1914. Serial No. 855,969.

*To all whom it may concern:*

Be it known that I, GEORG ADAM RENTSCHLER, a citizen of the United States, residing at Hamilton, Butler county, Ohio, have invented certain new and useful Improvements in Casters, of which the following is a specification.

The present invention relates to improvements in two-wheeled furniture casters of the well known Stengel type (see Stengel's United States Patent No. 428155), the objects of the invention being to improve the smoothness of working of the casters, to lessen the cost of construction, to strengthen the casters, and to enhance their durability, to facilitate the assembling of parts, and to prevent disorganization of the parts in use.

In one variety of furniture casters the casters are arranged to be attached to the furniture by means of a plate carried by each caster and secured under the furniture by means of wood screws going through the plate. Casters of this variety are known as plate casters.

In another variety of casters each caster is provided with an upwardly projecting stem to enter a socket formed in the base of the furniture, casters of this variety being known as stem casters.

My improvements are applicable to casters regardless of whether they be of the plate variety or stem variety, or a combination of both stem and plate. In casters of the Stengel type the wheels are carried by a housing and swiveled on a downwardly projecting stem, and in the present specification when I employ the word stem it is to be taken as meaning the downwardly projecting stem on which the housing is swiveled, and not to such stem as may project upwardly to engage a socket in the furniture.

In a one-wheeled furniture caster when the caster swivels upon the floor the axis of swiveling, as regards the floor, is at a point centrally below the wheel, the wheel itself having a swiveling motion on the floor, the result being an undesired degree of friction in the swiveling action and an undesired degree of wear upon the carpet upon which the caster may rest. In casters of the two-wheeled variety the swiveling of the wheel upon the floor, as just described, does not take place, for, as the caster swivels upon the floor, one of the wheels of the pair turns in one direction and the other wheel turns in the other direction, the rubbing friction in casters of the one-wheeled variety becoming rolling friction in casters of the two-wheeled variety. In order that the merit of two-wheeled casters may be realized it is of importance that both wheels of the casters bear upon the floor and support the load equally, and this equal bearing of the two wheels can only take place when the housing which carries the two wheels is at liberty to tilt freely upon the stem on a horizontal axis, and this condition should hold good not only when the caster is new but as wear takes place. Furthermore, in the Stengel caster this tilting motion of the housing upon the stem brings about the possibility in a worn caster of the collar-box taking such position that the series of anti-friction rollers may become disorganized and cause the housing to so bind upon the stem that there can be no free swiveling.

My improvements will be readily understood from the following description taken in connection with the accompanying drawing in which:—

Figure 1 is a side elevation of a caster exemplifying my present invention: Fig. 2 a vertical section of portions of the same in the plane of line *a* of Figs. 3 and 4: Fig. 3 a plan: and Fig. 4 a front elevation of the housing, a portion of the collar-box appearing in the plane of line *b* of Figs. 1 and 2.

In the drawing:—1, indicates the vertical stem on which the housing swivels: 2, a plate firmly secured at the top of this stem, this plate being either a plate adapted to serve in securing the caster to the furniture, as in furniture casters of the plate variety, and as typified in Fig. 3, or as a mere disk fast upon the stem: 3, an upper stem forming an upward prolongation of stem 1, to be provided only in casters of the stem variety: 4, the housing which is to carry the two floor wheels; 5, the axle carried by the housing for the floor wheels: 6, the two floor wheels carried by the housing, one at each side of the vertical plane of stem 1 at right angles to the axle 5: 7, an upwardly open concave bearing in a portion of the housing disposed below the stem: 8, a convex foot upon the stem, engaging the bearing 7; 9, circumferential groove in the base of the stem, above the foot 8: 10, a pin extending from this groove rearwardly through the central member of the housing and to the axle: 11, the collar-box fitted to freely turn on the stem below plate 2 and having counter-bores in its upper and lower surfaces: 12, a series of anti-friction rollers disposed in the counter-bore of the collar-box and adapted to bear against the stem and against the circular wall of the upper counterbore of the collar-box: 13, a rib carried upon the front of the central member of the housing: 14, the counterbore in the lower surface of the collar-box: 15, a horn projecting from the housing loosely up into counterbore 14: 16, a shoulder on the stem, below the collar-box: 17, a shoulder on the stem below plate 2: 18, an upper portion of the housing engaging the periphery of the collar-box: and 19, a dotted circle indicating the character of plate 2 in case the plate is to serve only as a roof over the collar-box.

The term "collar-box" is herein used as meaning the circular box 11 forming a loose collar rotatable upon the stem and forming a circular box to contain the anti-friction rollers 12.

Plate 2, whether it be an attaching plate or merely a roof-plate over the collar-box is rigidly secured to the stem by being tightly forced thereon, and riveted to the plate, as in Fig. 2, in case the stem does not project above the plate. Shoulder 17 definitely determines the position of the plate upon the stem and prevents the descent of the plate upon the stem even in case the plate gets loose on the stem.

Collar-box 11 is quite free upon the stem and is at liberty to turn upon or remain stationary relative to the stem. Shoulder 16 determines the vertical position of the collar-box upon the stem and while it permits a reasonable vertical motion of the collar-box upon the stem it limits the motion of the collar-box away from plate 2 and prevents the possibility of the collar-box moving so far downward from plate 2 as to permit rollers 12 to climb upon each other.

When the load is upon the caster and the parts are in the position indicated in Fig. 2, the load is transmitted vertically through the stem and to bearing 7 and to the axle and floor-wheels, and the housing acts as a bellcrank so that housing-part 18 is pressed against the periphery of the collar-box, and the collar-box forced toward the stem as far as rollers 12 will permit. As the housing does its tilting, to permit the two floor-wheels to take equal bearing upon the floor, the friction between housing-part 18 and the collar-box causes the collar-box to turn somewhat upon the stem, the anti-friction rollers rendering this motion easy. When the furniture is moved so as to cause swiveling of the housing upon the stem, the collar-box becomes in effect a part of the housing and turns upon the stem with it, the motion being rendered easy by the anti-friction rollers. The engagement of horn 15 within the lower counterbore of the collar-box prevents the rearward displacement of the upper portion of the housing. The general performance of the caster is as in the Stengel patent above referred to, but the collar-box is not subjected to vertical load, and its vertical position upon the stem is determined independently of the presence of the housing, and plate 2 is not an agent in preventing or limiting the forward and rearward oscillation of the housing upon the stem, and the collar-box is a symmetrical structure.

In the Stengel patent above referred to the housing was provided at its front with an upstanding rib, corresponding with rib 13 in my construction, the rib engaging the periphery of the collar-box as in my construction, but the forward displacement of this rib required to be restrained by a flanged collar fast with the stem. In my construction the collar-box has a downwardly projecting peripheral flange and the upper end of rib 13 is bifurcated, the member 15 of the bifurcation engaging within this flange of the collar-box while the other bifurcation, 18, engages the exterior of the collar-box.

I claim:—

In a furniture caster, the combination of a stem having a convex foot, and a two-wheeled housing having a concave bearing for the foot, of a collar-box free to turn upon the stem and provided with a counterbore in its upper face and with a downwardly projecting flange at its periphery, anti-friction rollers disposed in said counterbore and adapted to bear against the stem, a rib projecting up from the housing and having its upper end bifurcated, one member of the bifurcation engaging the periphery of the collar-box and the other member of the bifurcation engaging within said flange, and means carried by the stem independent of the presence of the housing for limiting the vertical motion of the collar-box upon the stem and for preventing the displacement of the rollers, substantially as set forth.

GEORG ADAM RENTSCHLER.

Witnesses:
ROBERT B. MILLIKIN,
M. S. BELDEN.

Copies of this patent may be obtained for five cents each, by addressing the "Commissioner of Patents, Washington, D. C."